2,752,309

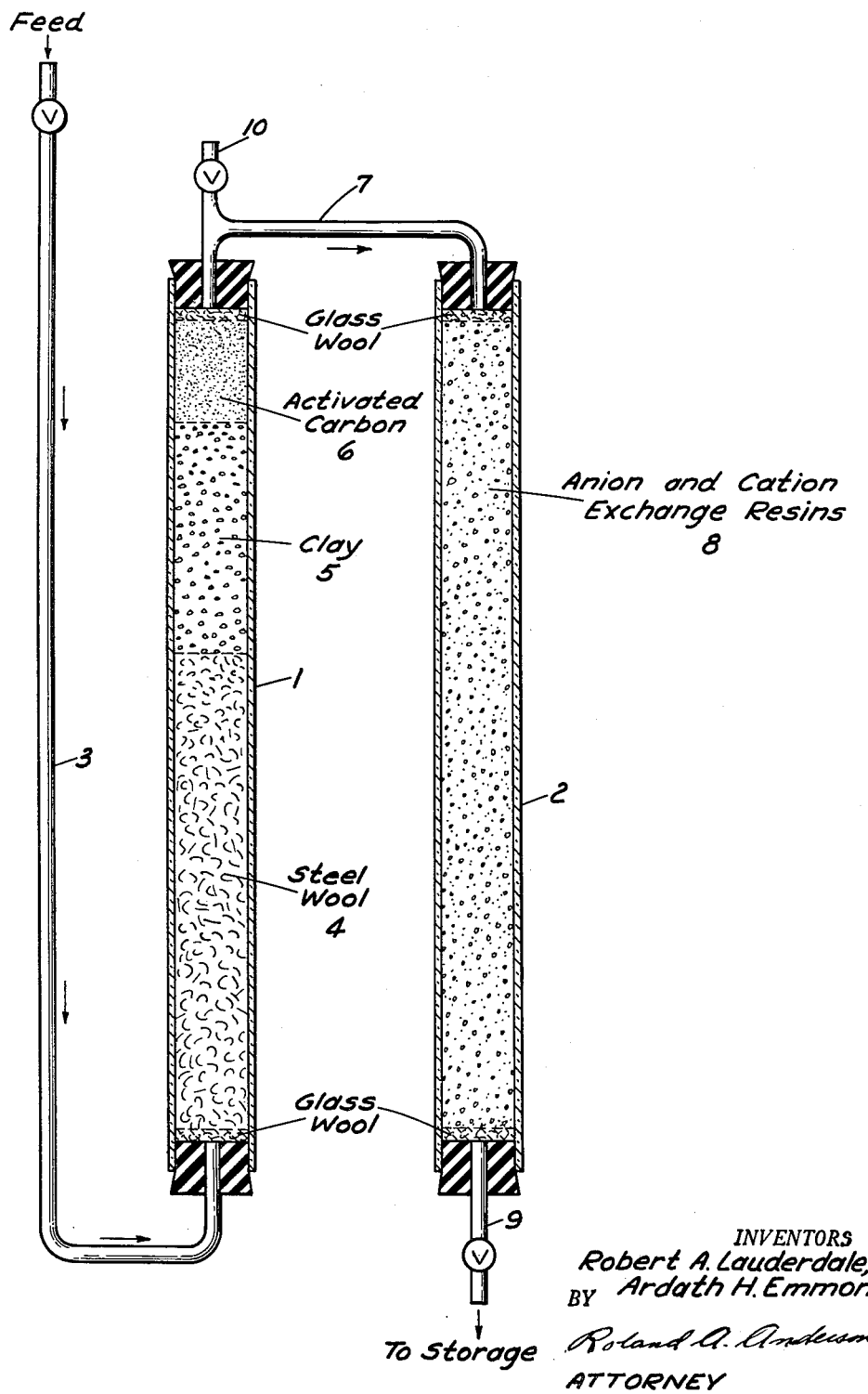

PROCESS FOR WATER DECONTAMINATION

Ardath H. Emmons, Ann Arbor, Mich., and Robert A. Lauderdale, Jr., Cambridge, Mass., assignors to the United States of America as represented by the United States Atomic Energy Commission Application April 30, 1952, Serial No. 285,108

4 Claims. (Cl. 210—24)

Our invention relates to a process for decontaminating water and more particularly to an improved method and apparatus for removing fission products or other radioisotopes from radioactively contaminated water.

Radioactively contaminated water may come from various sources, for example, from waste solutions produced in various chemical processes usually associated with the operation of nuclear reactors, and from waste solutions from laboratories and hospitals where radioactive materials are used in research and medicine.

In addition to these sources of contaminated water in the form of wastes, contamination of drinking water supplies may result from the explosion of an atomic bomb, particularly from an under-water explosion, or from other forms of radiological warfare. If a drinking water supply were thus contaminated, the affected population would be presented with a serious physiological problem.

In the past, radioactive waste solutions from operations associated with nuclear reactors have often been disposed of, usually after storage to permit decay of short-lived activities, by dilution with large volumes of water in natural water courses. Such a procedure is usually not available to hospitals or most research installations, however, and would obviously have little applicability to the emergency production of potable water from a contaminated supply.

Evaporation of waste solutions has also been employed to secure condensates of sufficiently reduced activity for immediate discharge into natural water courses. This procedure is not well adapted to the intermittent and relatively small volume operations of hospitals and many research laboratories. Evaporation would also be unsuitable for the emergency production of potable water from a radioactively contaminated supply in view of the danger of volatile contaminants being carried into the condensate, and in view of the adverse effect a probable power failure would have on many evaporator installations.

An object of our present invention, therefore, is to provide an improved process and apparatus for decontaminating radioactively contaminated water.

A further object of our invention is to provide an improved process and apparatus for reducing to a physiologically safe level the radioactive contamination of water which is contaminated with fission products or other radioisotopes.

Still another object is to provide a process and apparatus especially suited for emergency production of potable water from radioactively contaminated water.

Additional objects and advantages of the present invention will appear from the following description.

In accordance with our present invention, water contaminated with nuclear fission products or other radioisotopes may be substantially completely decontaminated by contacting the contaminated water with steel wool, clay, activated carbon, an anion exchange resin and a cation exchange resin until said water is substantially completely decontaminated or is made at least physiologically safe.

Using the method and apparatus of our invention, water containing substantial quantities of radioactivity, for example, 2.5 microcuries of mixed fission products ($5 \times 10^6$ disintegrations/min.) per milliliter of water, may be treated in a compact and relatively inexpensive unit to produce a water with activity of less than $10^{-4}$ microcurie per milliliter. This level of contamination is well below the concentration usually considered to be safe for use under emergency conditions ($10^{-2}$ microcuries per milliliter).

In general, a substantial portion of the total decontamination achieved with the method of our invention may be effected by employing a metal selected from those more electro-positive than oxygen. (See The Electro-motive Force Series of Elements, page 1,439, "Handbook of Chemistry and Physics," thirteenth edition, Chemical Rubber Publishing Co., Cleveland, Ohio.) These metals also appear to be identical with metals having a tendency to rust or oxidize in the presence of moisture. It is well known that all metals down to copper, which lies closely above oxygen in the electromotive series, oxidize with comparative ease, and that the metals below copper do not readily oxidize. However, metals that are extremely electro-positive (that is oxidize very rapidly, for example, sodium and metals above sodium in the series) react to an excessive degree when employed under the aqueous conditions herein described, and for this reason may be unsuitable for use in our system.

Thus, suitable metals are, for example, zinc, magnesium, copper, and aluminum. However, zinc verges on being excessively reactive, although its contribution to decontamination is relatively high. Magnesium, aluminum, and copper, are relatively stable and provide fair results, their decontamination contributions consisting roughly of 34%, 22%, and 19%, respectively. However, we find that iron unexpectedly provides about 85% of the total decontamination, and when employed in the proper physical form, has good chemical stability. It is, therefore, very superior to any of the other metals in the group herein described and is, accordingly, highly preferred. In view of its unique superiority over other suitable metals, and in view of its relatively low cost, our invention will be further illustrated specifically with respect to iron.

Numerous physical forms of iron or other metals are suitable for use with our system. Generally suitable are chip or granular forms in sizes ranging from about 10 mesh to about 60 mesh while about 40 mesh is preferred. With less reactive metals, the smaller particle size is preferred while the reverse is true for the more reactive metals. However, we find that iron in the form of ordinary steel wool, about grade 0, is especially suited for use in our invention. This material demonstrates adequate durability under operating conditions, and appears to possess the correct degree of oxidation reactivity to secure the desired decontamination factor while remaining free from plugging for prolonged operating periods.

In general, a wide variety of clays may be utilized in the practice of our invention. Suitable clays, for example, are kaolinite and montmorillonite; while clays such as "Multa-Sorb," a calcined clay, are generally preferred for their superior mechanical stability.

We find that these clays are highly efficient for the adsorption of cesium and to a lesser extent for strontium. In addition, the clays serve as a filter and adsorbent for small amounts of iron which may dissolve from the steel wool.

Activated carbon is not critical to the successful operation of our invention, but for purposes of supplying potable water, is utilized for taste, color and odor control. In addition, small amounts of iron and minute portions of radioactivity that may not be removed by other materials may be removed by the carbon, thereby providing a greater decontamination safety factor.

Numerous suitable anion and cation adsorbents, or exchangers, are available for use with our invention. However, particularly advantageous results may be obtained by utilizing such cation exchangers as nuclear-sulfonic polystyrene type resins commercially available in such forms as "Dowex 50," "Amberlite IR–120," and "Permutit Q," and such anion exchangers as quaternary amine-polystyrene type resins available in such forms as "Dowex 2" and "Amberlite IRA–410."

When utilizing cation and anion exchangers in conjunction with each other, it is generally preferred to supply them in substantially chemically equivalent amounts. Although satisfactory results may be achieved using the exchangers separately (for example, a layer of cation exchanger followed by a layer of anion exchanger in a column), it is generally preferred to utilize them in the form of an intimate mixture. Such a mixture is commercially available as "Amberlite MB–3" which contains "Amberlite IR–120" a nuclear-sulfonic polystyrene cation exchange resin and "Amberlite IRA–410" a quaternary amine polystyrene anion exchange resin, the former in slight chemical excess. This mixture has the added advantage of being obtainable with a pH sensitive dye associated with the anion exchange resin which changes from blue to yellow when the anion exchange resin is exhausted. This is due to the non-neutralized release of hydrogen ion by the slight excess of cation exchange resin.

When cation and anion exchange resins are utilized separately, regeneration of these resins after saturation may be simply accomplished, if desired, by treating the cation exchanger with an acid such as HCl or $H_2SO_4$ to convert it to the preferred hydrogen form, and by treating the anion exchanger with a base such as NaOH to effect conversion to the preferred hydroxyl form. Since cation and anion-exchange resin particles are usually of different densities, mixed resins may be separated after use, by a flotation process, and thus may also be regenerated by the methods just described.

It is preferred to utilize the resins in the hydrogen and hydroxyl forms, so that their reactions with the contaminants in the radioactively contaminated water produce only water as a reaction product.

Suitable flow rates through the resin bed for effecting the decontamination of water as herein described are from about 1 milliliter/minute/square centimeter of bed area to about 20 milliliters/minute/square centimeter of bed area while a rate of approximately 12 milliliters/minute/square centimeter of bed area is preferred. However, these flow rates are not critical and even higher flow rates are possible if ordinary engineering precautions obvious to those skilled in the art are employed.

Any suitable solid-liquid contacting apparatus may be used to effect the process of our invention. The apparatus may comprise, for example, a single column or vessel, or a plurality of columns or vessels in series.

The collective capacity of the decontaminating materials in the apparatus is dependent upon the total ion concentration of the radio-actively contaminated water. Exhaustion of the materials may be indicated by color change of a dye in the final ion exchange bed, as previously mentioned. However, for greatest safety the water emerging from the apparatus should be continuously monitored for any break-through of activity with a conventional radiation indicating device, such as a Geiger-Mueller counter.

A suitable system for effecting a preferred embodiment of our invention is illustrated diagrammatically in the accompanying drawing.

Referring to the drawing, two vertical columns 1 and 2 are provided for contacting the radioactively contaminated water with successive layers of decontaminating materials. Valved, liquid feed inlet line 3 communicates with the bottom of column 1. Column 1 is filled with a layer of steel wool 4, a layer of burnt clay 5, and a layer of activated carbon 6, and is provided near the top with valved, liquid transfer line 7 which communicates with the top of column 2. Line 7 is supplied with valved vent line 10. Column 2 is filled with a mixture 8 of approximately chemical equivalents of a cation exchange resin and an anion exchange resin and is provided near the bottom with valved, liquid discharge line 9.

In a suitable construction for laboratory use, columns 1 and 2 were glass columns 26" high and ¾" inside diameter. Column 1 was closed at the bottom with a conventional stopper through which inlet line 3 was passed. The column was packed, starting from the bottom, with a thin layer of glass wool to prevent plugging of the inlet line, 15" of steel wool, grade 0, weighing 50 grams, 7" of moist burnt clay ("Multa-Sorb"), weighing 37 grams dry, and 3" of moist activated carbon ("Carbo-Dur," manufactured by Permutit Company), weighing 12 grams dry. Another thin layer of glass wool was added on top of these layers and the column closed with another stopper which supported line 7. Column 2 was stoppered in a similar manner while being filled with 144 grams of mixed resins ("Amberlite MB–3" a mixture of a nuclear sulfonic polystyrene cation exchange resin and a quaternary amine polystyrene anion exchange resin), containing approximately 48 grams, dry weight, of cation exchange resin and approximately 96 grams, dry weight, of anion exchange resin.

In operation of the apparatus just described, radioactively contaminated water containing approximately 2.5 microcuries of a fission product mixture, per milliliter, was passed upward through column 1 and downward through column 2 at a flow rate of about 12 milliliters/min./cm.$^2$ of column cross section. Thirty liters of the contaminated water were passed through the apparatus before the activity of the collected, decontaminated water rose to $10^{-4}$ microcuries per milliliter. Thus, more than 82 volumes of water was treated per volume of solid contacting agent, and the break-through at this point amounted to only 0.04% of the original radioactivity. This final concentration is considered safe for emergency drinking purposes.

Greater decontamination capacity of the apparatus may be obtained by increasing the diameters of the columns and adding proportionately increased amounts of decontaminating materials. Increased flow rates, with equally effective results, may be obtained by increasing the head of liquid on the columns, while simultaneously increasing the length of the columns and adding proportionately increased amounts of materials. Generally, the decontamination capacity of our system is proportional to the total volume of decontaminating agents employed.

Only one column, containing all of the decontaminating agents, would be suitable for the operation of our invention. However, for greater compactness and protection from breakage two shorter columns are preferred, and an even larger number of still shorter column sections may be utilized, if desired. In addition, the columns and associated apparatus may be constructed out of materials other than glass, such as suitable metals or plastics.

The relative efficiencies of the various preferred components of our system are indicated by the data given in the following Table I, which contains the results of radiochemical analyses made on the activity eluted from each component following a test run using a fission product solution about one month old.

The table shows that 85.3% of the radioactivity was removed by the steel wool, 12.0% by the clay, 0.8% by the carbon, 1.9% by the cation-exchangers, and 0.2% by the anion-exchangers. The remainder of the table shows the percentages of specific isotopes on each of the components. In another test run, with a 60 hour old mixture of isotopes, not shown in Table I, the steel wool accounted for about 86.3% of the total radioactivity, the clay and carbon combined for 2.5% and the mixed resin bed for about 11.3%.

It is apparent from the above table that substantial quantities of radioactivity may be removed from radioactivity contaminated water by only a partial treatment, eliminating one or more components of our invention, for example clay and/or carbon. Although a physiologically safe level of activity would not thus be attainable, the problem confronting the user of our system may involve merely reducing the activity of the water to a level safe for disposal and/or dilution in a conventional sewerage system or in a local body of water. Thus, it may be possible for latter purposes to treat the contaminated water with a minimum suitable member of the components described herein in order to achieve a desired decontamination result as predetermined by the intended manner of disposition of the final water product.

TABLE I

*Radiochemical analysis of activity adsorbed by the materials in the decontaminator*

| Isotope | Steel Wool | Burnt Clay | Activated Charcoal | Cation Resin | Anion Resin |
|---|---|---|---|---|---|
| Total Beta, c./m | $2.35 \times 10^9$ | $3.3 \times 10^8$ | $2.21 \times 10^7$ | $5.28 \times 10^7$ | $5.87 \times 10^5$ |
| Percent of total Beta | 85.26 | 11.99 | 0.80 | 1.92 | 0.21 |
| Ruthenium, c./m | $4.43 \times 10^7$ | $1.67 \times 10^6$ | $6.53 \times 10^4$ | $8.89 \times 10^4$ | $4.0 \times 10^4$ |
| Percent of total Ru | 95.96 | 3.62 | 0.14 | 0.19 | 0.09 |
| Zirconium, c./m | $1.72 \times 10^8$ | $7.37 \times 10^5$ | $1.05 \times 10^5$ | $1.87 \times 10^5$ | $3.06 \times 10^4$ |
| Percent of total Zr | 99.39 | 0.43 | 0.061 | 0.108 | 0.018 |
| Strontium, c./m | $3.19 \times 10^8$ | $8.36 \times 10^7$ | $1.63 \times 10^7$ | $3.83 \times 10^7$ | $3.69 \times 10^5$ |
| Percent of total Sr | 69.72 | 18.27 | 3.56 | 8.37 | 0.81 |
| Total Rare Earths, c./m | $1.54 \times 10^9$ | $2.31 \times 10^8$ | $1.64 \times 10^6$ | $1.21 \times 10^6$ | $5.94 \times 10^4$ |
| Percent of total R. E | 86.81 | 13.02 | 0.09 | 0.06 | 0.003 |
| Cerium,[1] c./m | $6.81 \times 10^8$ | $1.99 \times 10^7$ | $2.34 \times 10^4$ | $1.51 \times 10^5$ | $1.36 \times 10^4$ |
| Percent of total Ce | 97.13 | 2.84 | 0.003 | 0.02 | 0.002 |
| Cesium, c./m | $2.39 \times 10^6$ | $1.60 \times 10^6$ | None found | $5.72 \times 10^3$ | $5.06 \times 10^3$ |
| Percent of total Cs | 59.74 | 39.99 | 0.0 | 0.14 | 0.13 |
| Niobium, c./m | $6.99 \times 10^5$ | $4.10 \times 10^4$ | $8.25 \times 10^3$ | $3.12 \times 10^4$ | $1.14 \times 10^4$ |
| Percent of total Nb | 98.7 | 0.58 | 0.12 | 0.44 | 0.16 |
| Tellurium, c./m | $1.15 \times 10^7$ | $1.05 \times 10^5$ | $2.3 \times 10^4$ | $2.77 \times 10^4$ | $3.87 \times 10^4$ |
| Percent of total Te | 98.34 | 0.89 | 0.19 | 0.237 | 0.331 |

[1] Cerium is also included in total rare earths.

The foregoing embodiment of our invention is representative of its preferred form, but it is to be understood that various modifications and changes may be made therein by those skilled in the art. For example, any sequence or mixture of carbon, clay and ion-exchange adsorbents may be employed immediately following the metal layer, without seriously affecting the operation of our system. Accordingly, it is intended that the invention in all its equivalent forms and aspects comes within the meaning of the claims attached hereto.

This application is a continuation-in-part of our copending application Serial Number 208,421, filed January 29, 1951.

What is claimed is:

1. A process for reducing the radioactivity of water containing trace quantities of radioactive nuclear fission products of the group consisting of radioactive isotopes of Ru, Zr, Sr, Ce, Cs, Nb, Te, and rare earth elements to a physiologically safe level for human consumption, comprising the steps of first removing substantially more than half of each of said radioactive isotopes by contacting said water with finely divided readily oxidizable ferrous metal, and subsequently removing additional amounts of the remainder of each of said radioactive isotopes by contacting the resulting water with adsorbents comprising an argillaceous adsorbent, a cation exchange adsorbent and an anion exchange adsorbent.

2. The process of claim 1 in which the finely divided readily oxidizable ferrous metal is steel wool, the argillaceous adsorbent is burnt clay, the cation exchange adsorbent is a sulfonated polystyrene cation exchange resin, and the anion exchange adsorbent is a quaternary amine polystyrene anion exchange resin.

3. A process for reducing the radioactivity of water containing trace quantities of radioactive nuclear fission products of the group consisting of radioactive isotopes of Ru, Zr, Sr, Ce, Cs, Nb, Te, and rare earth elements to a physiologically safe level for human consumption, comprising the steps of first removing substantially more than half of each of said radioactive isotopes by passing said water through a bed of steel wool, and subsequently removing additional quantities of each of said radioactive isotopes by passing the resulting water sequentially through beds of adsorbents comprising burnt clay, activated carbon, and mixed sulfonated polystyrene cation exchange resin and quaternary amine polystyrene anion exchange resin.

4. The process of claim 3 in which the steel wool, burnt clay, activated carbon, and mixed ion exchange resins are in the approximate weight ratio 50:37:12:144.

References Cited in the file of this patent

UNITED STATES PATENTS

| | | |
|---|---|---|
| 197,637 | Johnson | Nov. 27, 1877 |
| 1,781,314 | Brandt | Nov. 11, 1930 |
| 2,027,410 | Weir | Jan. 14, 1936 |
| 2,090,467 | Borrowman | Aug. 17, 1937 |
| 2,098,431 | Portridge | Nov. 9, 1937 |
| 2,210,966 | Urbain | Aug. 13, 1940 |
| 2,525,497 | Monfried | Oct. 10, 1950 |
| 2,616,847 | Ginell | Nov. 4, 1952 |
| 2,623,013 | D'Alelio | Dec. 23, 1952 |
| 2,628,193 | D'Alelio | Feb. 10, 1953 |

OTHER REFERENCES

Ayers: "Radioactive Waste Disposal," U. S. Atomic Energy Commission, A. E. C. D., 2802, Dec. 7, 1949.